(12) United States Patent
Lopez Lecube et al.

(10) Patent No.: US 9,939,908 B2
(45) Date of Patent: Apr. 10, 2018

(54) MULTI-DEVICE AUTHENTICATION

(71) Applicant: Paypal, Inc., San Jose, CA (US)

(72) Inventors: Tiano Freixas Lopez Lecube, San Jose, CA (US); Josh Miller, San Jose, CA (US); Thomas Jaeger, San Jose, CA (US); Sam Oh, San Jose, CA (US); Wenhan Zhao, San Jose, CA (US); Eric Min, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 226 days.

(21) Appl. No.: 14/868,243

(22) Filed: Sep. 28, 2015

(65) Prior Publication Data

US 2017/0093846 A1    Mar. 30, 2017

(51) Int. Cl.
| | |
|---|---|
| *G06F 3/01* | (2006.01) |
| *H04L 29/06* | (2006.01) |
| *G06F 3/0488* | (2013.01) |
| *G06F 3/0487* | (2013.01) |
| *H04L 9/32* | (2006.01) |
| *G06F 21/33* | (2013.01) |
| *G06F 1/16* | (2006.01) |

(52) U.S. Cl.
CPC .......... *G06F 3/017* (2013.01); *G06F 3/0487* (2013.01); *G06F 3/0488* (2013.01); *H04L 63/0853* (2013.01); *G06F 1/1694* (2013.01); *G06F 21/33* (2013.01); *G06F 2200/1636* (2013.01); *G06F 2203/04808* (2013.01); *H04L 9/3213* (2013.01); *H04L 9/3268* (2013.01)

(58) Field of Classification Search
CPC ........ G06F 21/33; G06F 1/1694; G06F 3/017; G06F 3/0487; G06F 3/0488; G06F 2200/1636; G06F 2203/04808; H04L 9/3213; H04L 9/3268; H04L 63/0853
USPC ............................................. 726/7
See application file for complete search history.

(56) References Cited

U.S. PATENT DOCUMENTS

| | | | | |
|---|---|---|---|---|
| 7,301,526 | B2* | 11/2007 | Marvit ................. | G06F 1/1626 345/156 |
| 8,516,561 | B2* | 8/2013 | White ..................... | G06F 3/017 726/18 |
| 8,539,550 | B1* | 9/2013 | Terres ..................... | G06F 21/31 726/16 |
| 8,856,640 | B1* | 10/2014 | Barr ..................... | G06F 17/2288 713/158 |
| 9,141,150 | B1* | 9/2015 | Trundle ................ | G06F 1/1694 |
| 9,430,144 | B1* | 8/2016 | Alsvig ................... | H04W 12/06 |
| 9,542,004 | B1* | 1/2017 | Hu ........................ | G06F 3/04883 |
| 2007/0070050 | A1* | 3/2007 | Westerman ........... | G06F 3/0235 345/173 |
| 2010/0082990 | A1* | 4/2010 | Grigorovitch ......... | H04W 12/06 713/176 |

(Continued)

*Primary Examiner* — Hadi Armouche
*Assistant Examiner* — Shahriar Zarrineh
(74) *Attorney, Agent, or Firm* — Haynes and Boone, LLP

(57) ABSTRACT

A system and method uses multiple devices in concert as security for accessing an account. The system and method may use one or more security measures based on unique gestures, coordinated gestures between two devices, presence of multiple devices, sequence of actions, and other measures to prevent fraud. Additionally, these security measures may be rearranged or changed such that the devices may collaborate to provide access to multiple different accounts.

16 Claims, 7 Drawing Sheets

(56) References Cited

U.S. PATENT DOCUMENTS

| | | | |
|---|---|---|---|
| 2010/0134424 A1* | 6/2010 | Brisebois | G06F 3/03547 345/173 |
| 2010/0225443 A1* | 9/2010 | Bayram | G06F 21/316 340/5.83 |
| 2011/0066985 A1* | 3/2011 | Corbin | G06F 3/04883 715/863 |
| 2012/0127072 A1* | 5/2012 | Kim | G10L 15/24 345/156 |
| 2012/0188096 A1* | 7/2012 | Corndorf | A61N 1/37252 340/870.07 |
| 2012/0260220 A1* | 10/2012 | Griffin | G06F 3/033 715/863 |
| 2012/0300247 A1* | 11/2012 | Hama | H04N 1/00204 358/1.14 |
| 2013/0269013 A1* | 10/2013 | Parry | H04L 63/0861 726/7 |
| 2013/0271397 A1* | 10/2013 | MacDougall | G06F 3/017 345/173 |
| 2013/0328786 A1* | 12/2013 | Hinckley | G06F 3/033 345/173 |
| 2014/0245457 A1* | 8/2014 | Qi | G06F 21/6245 726/26 |
| 2014/0372762 A1* | 12/2014 | Flautner | H04L 9/3226 713/173 |
| 2015/0074615 A1* | 3/2015 | Han | G06K 9/00033 715/863 |
| 2015/0103018 A1* | 4/2015 | Kamin-Lyndgaard | G09G 5/006 345/173 |
| 2015/0117645 A1* | 4/2015 | Carlson | H04L 63/0435 380/262 |
| 2015/0130709 A1* | 5/2015 | Dangi | G06F 3/0383 345/156 |
| 2015/0147968 A1* | 5/2015 | Friedman | H04W 76/023 455/41.2 |
| 2015/0205350 A1* | 7/2015 | VanBlon | G06F 3/014 345/158 |
| 2015/0234475 A1* | 8/2015 | Latta | G06F 3/017 345/156 |
| 2015/0371024 A1* | 12/2015 | Kim | G06F 21/32 726/18 |
| 2016/0085954 A1* | 3/2016 | Tunnell | H04L 63/18 726/7 |
| 2016/0364112 A1* | 12/2016 | Bao | G06F 3/0488 |
| 2017/0039410 A1* | 2/2017 | Pi | G06F 1/1643 |
| 2017/0046038 A1* | 2/2017 | Hajas | G06F 3/0414 |
| 2017/0147125 A1* | 5/2017 | Yang | G06F 1/1694 |
| 2017/0242580 A1* | 8/2017 | Gdala | G06F 3/04883 |

* cited by examiner

MULTI-DEVICE AUTHENTICATION

BACKGROUND

The present disclosure generally relates to authentication systems and more particularly to authentication systems that implements multiple electronic devices.

As electronic devices have gotten smaller and smaller, more and more everyday objects, such as cellphones and watches, have become computerized and are connected to the Internet. These devices are sometimes used to authenticate a user for certain functions. For example, these devices may sometimes store payment information which releases the payment information upon a user providing a security credential, such as entering in a username and password. These functions are in place to ensure that the user is truly authorized to transfer funds from an account.

Similarly, other types of accounts also use some form of security credentials for ensuring that access to the account is only provided to an authorized user. Some exemplary accounts may include e-mail accounts, social media accounts, e-commerce website accounts, computer accounts, and/or the like.

Most accounts use usernames and passwords to authenticate a user. In some cases, an account may accept a biometric signature, such as a fingerprint or facial image, for a security credential. However, a user may find that performing these forms of authentication may be difficult or cumbersome. Additionally, users often have different passwords for every account and they may find it difficult to remember all of the passwords, especially when passwords for different accounts have different requirements, such as length and number of special characters. Furthermore, entering passwords on smaller devices may be difficult due to limited display size and missing keypad capabilities. In some cases, entering in a password may be very difficult for some electronic devices, such as a single button wristband without a touch screen. This is especially true for extra secure passwords that often have over ten letters, numerals, and special characters.

Another issue with the current implemented methods of authentication is that these methods are not very accessible to users with disabilities. For example, individuals who have limited mobility or are missing limbs may find entering passwords or providing a fingerprint difficult. Therefore, an authentication system or method of providing security credentials that is more secure and less cumbersome would be desirable

Figure 1:
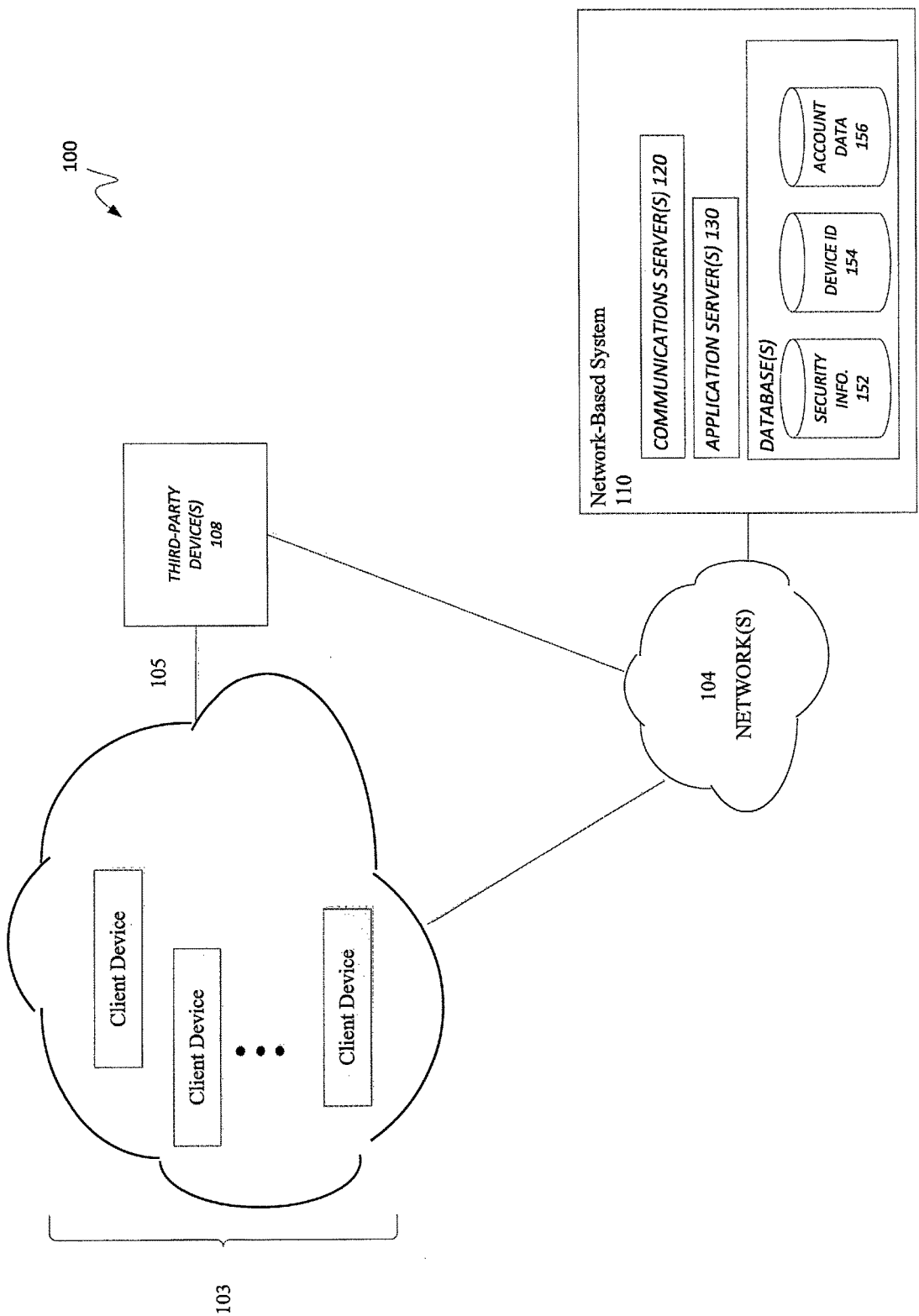
FIG. 1 is a block diagram of an exemplary computing system that is adapted for implementing a multi-device authentication system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, a system and method for multi-device secure authentication is disclosed. Instead of using passwords and fingerprints to gain access to an account, a plurality of user devices may be used. The plurality of devices may work in concert to be used as an authentication mechanism. In some examples, a plurality of devices each maintains part of a credential that can be communicated by performing one or more actions with the plurality of devices. When all of the parts of the credentials are received by a single device, access to an account may be granted. In some examples, the order in which the credentials are communicated also determines whether access to an account is granted. In some embodiments, the actions performed may be a gesture with the devices, for example, waving the device. In some examples, the devices may be implants in the fingers of a user which the user may then perform a series of typing/tapping motions with the fingers as a gesture causing one or more of the implants to communicate security or authentication information. In other embodiments, the device may be implanted into other body parts of a user, such as the ear, neck, shoulder, arm, leg, stomach, elbow, hand, buttock, thigh, and the like, so that one device (such as implanted in a finger of the user) can be brought in proximity to another part of the user's body to trigger an authentication or other action.

In some embodiments, a system for security and authentication of a user based on network communications, includes receiving a first motion data from a first device of the user, receiving a second motion data from a second device of the user, accessing a memory storing information corresponding to an account of the user, comparing the first motion data and the second motion data with authentication motion data associated with the account of the user; and providing the user access to the account when the first motion data and the second motion data match the authentication motion data.

In some embodiments, the gestures may be complicated and the plurality of devices may use one or more sensors to measure and determine the gesture movements of one of the devices in relation to each other. In this manner a device gesture in relation to another device may be used as an input to cause one or more devices to communicate security information, for example, tapping or circling one device around another device.

The system described herein may in some cases allow for simple and easy authentication for multiple accounts. For example, a user may mimic playing a piano song in the air with their fingers, each finger including an implant. The motion of the fingers may then authenticate an account. The user may be able to have a different piano playing motion with varying lengths to access different accounts. Other simpler motions may be used, such as touching an index finger having an implant with a lapel pin and another finger having another implant, each implementing one or more of the systems and methods described herein. Furthermore, because these devices are personal, it would provide a level of security that a user name and password would not allow. For example, a thief wanting to access an account may need all the personal items that carry or convey the security information for an account and then perform specific gestures with each personal item in the correct order to access the account. Furthermore, because some of the devices are implants, these devices may be difficult to steal.

In other embodiments, the motions described herein performed by the user may be used to trigger actions other than for authentication, security, or account access. For example, a specific motion or sequence of motions may cause a particular phone number to be dialed (such as an emergency number, a police number, a family member number, and the like), a particular text to be sent to one or more phone numbers, etc.

In some embodiments, a multi-device security system includes a first device with one or more processors coupled to a memory and that executes instructions from the memory to perform several steps. The steps may include detecting a second device, establishing a communication channel with the second device, receiving, through the communication channel, a first authentication code from the second device, comparing the first authentication code with a second authentication code stored on the memory of the first device, receiving, from a sensor, data indicative of a first gesture, comparing the data indicative of a first gesture with data indicative of a second gesture, and accessing an account in response to the first and second authentication codes matching and the first and second gestures matching.

In some embodiments, one or more non-transitory computer readable media may include instructions that, when executed by a device, causes the device to perform several steps. The steps may include receiving, from a sensor, data indicative of a first gesture performed with a second device in relation to the first device, comparing the data indicative of a first gesture with data indicative of a second gesture, establishing a communication channel with the second device in response to the first and second gestures matching, receiving, through the communication channel, a first authentication code from the second device, comparing the first authentication code with a second authentication code, and accessing an account in response to the first and second authentication codes matching.

In some embodiments, a computer implemented method includes several steps. The steps may include detecting a plurality of devices, establishing at least one communication channel with one of the plurality of devices, receiving a first plurality of authentication codes from the plurality of devices, comparing the first plurality of authentication codes with a second plurality authentication codes stored on the memory of the first device, storing received sensor data as part of a data indicative of a first gesture, comparing the data indicative of the first gesture with data indicative of a second gesture, and sending credentials for an account to a third device in response to the first and second plurality of authentication codes matching and the first and second gestures matching.

FIG. 1 illustrates an exemplary embodiment of a computing system 100 adapted for implementing a system and method for multi-device security. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements. Computing system 100 may include one or more client devices 103, such as a laptop, a mobile computing device, a tablet, a PC, a wearable device, a cellular telephone, smart phone, smart watch, fitness tracker band, biometric sensors, electronic implants, radio frequency identifiers (RFIDs), and/or other devices.

One or more of client devices 103 may provide one or more client programs, such as system programs and application programs to perform various computing and/or communication operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), biometric monitoring and sensor applications (e.g. heart rate monitor, heat monitors, pedometers, skin humidity, finger print scanner and/or the like).

In some embodiments, one or more of client devices 103 may be a simple electronic device maintaining information or code that may be communicated and/or extracted from the simple electronic device. For example, one or more client devices 103 may simply be an RFID or an image that an optical reader may be able to read and extract data from. In some examples, one or more client devices 103 may be a simple broadcasting beacon that broadcasts data wirelessly, for example, a Bluetooth® Low Energy (BLE) beacon. The broadcasting beacon may broadcast data wirelessly to limited or short distances, such that the wireless communication can be picked up by receivers that are placed next to the beacon and/or within a threshold distance of the beacon. In some embodiments, the wireless beacon may have pairing technology, such that communications with other devices may be limited unless the devices are paired with the beacon.

In some examples, one or more of client devices 103 may be or have an implantable electronic device that may have wireless communication capabilities with other devices. For example, the electronic implant may communicate through electromagnetic induction. In some examples, the electronic implant may communicate wirelessly using one or more communication standards such as medical implant communication service (MICS), Wi-Fi, Bluetooth, and/or the like. However, one benefit of communicating through electromagnetic induction is that it generally requires little energy and may easily be powered and/or charged through inductive coupling. It would be beneficial to have an implant be inductively powered due to the semi-permanent nature of implants and the inability to access the device once implanted. In some examples, the implant may have a battery that may be recharged wirelessly using a wireless charger. Wireless charging may also be referred to as inductive charging.

In some examples the implant may be coated, encased, and/or made using materials that are non-reactive, non-toxic, non-allergenic, non-carcinogenic, and/or resists corrosion. In some examples, the implant may be coated, encased, and/or made using materials that that has been empirically tested to not or rarely produce a foreign-body inflammatory response and does not support the growth of microorganisms. Some examples of such materials include but are not limited to silicon, polytetraflouroethylene, titanium, gold, and/or the like. In some examples, dielectric materials which allow electromagnetic waves to pass with low signal loss, such as polytetraflouroethylene and other dielectrics, may be used to encase an electronic implant. In this manner, the electronic components may be shielded from contacting bodily fluids and still be able to conduct wireless communications.

As shown, one or more client devices 103 may be communicatively coupled via one or more networks 104 to a network-based system 110. Network-based system 110 may be structured, arranged, and/or configured to allow one or more client devices 103 to establish one or more communication sessions to network-based system 110. Accordingly, a communications session between client devices 103 and network-based system 110 may involve the unidirectional and/or bidirectional exchange of information and may occur over one or more types of networks 104 depending on the mode of communication. While the embodiment of FIG. 1 illustrates a computing system 100 deployed in a client-server operating environment, it is to be understood that other suitable operating environments and/or architectures may be used in accordance with the described embodiments.

Communications between client devices 103 and the network-based system 110 may be sent and received over one or more networks 104 such as the Internet, a WAN, a WWAN, a WLAN, a mobile telephone network, a landline telephone network, as well as other suitable networks. The communications may include authentication data and other information which a server may use to identify the user with and determine an intention of the user, such as an intention to authorize a payment. Any of a wide variety of suitable communication types between client devices 103 and system 110 may take place. In particular, wireless communications of any suitable form may take place between client device 103 and system 110, such as that which often occurs in the case of mobile phones or other personal and/or mobile devices. In some embodiments, the communications may be encrypted.

In some embodiments, client devices 103 may be owned, managed, or operated by a single entity, such as a person, that may generally be carried, implanted, and/or worn on the user. For example client devices 103 may include a smart watch, smart phone, fitness band, medical implant and/or the like. As additional objects become computerized and fitted with wireless communications capabilities, such as clothing, jewelry, pace makers, medical band, anklets, bracelets, handcuffs, belts and other wearable objects, these objects may also include or be part of client devices 103. In some embodiments, client devices 103 may form a mesh network and/or a personal area network. The personal area network may be created using short range wireless communicators such as Bluetooth®, Bluetooth® low energy, wireless infrared communications, wireless USB, Wi-Fi or other wireless technologies for exchanging data over short distances. In some embodiments, one or more of client devices 103 may act as a wireless hotspot for other client devices 103 to connect to one or more networks 104 and communicate with network-based system 110.

In some embodiments, computing system 100 may include one or more third-party devices 108 which may be able to communicate with one or more client devices 103 through a communications channel 105. Communications channel 105 may be allow for bidirectional communications through one or more wireless communication channels using wireless communication protocols, such as near field communications (NFC), Wi-Fi, Bluetooth®, Bluetooth® low energy, infrared, and/or any other suitable wireless communications discussed herein. In some examples, the communications channel 105 may be a unidirectional communicator. For example, third-party device may be able to receive data and/or information from one or more client devices 103 using a barcode scanner. In some examples, either the one or more third-party devices or one or more client devices 103 may be a unidirectional wireless beacon that sends out signals that the other device may be able to receive. In some embodiments, one or more third-party devices 108 may communicate with one or more client devices 103 and/or network-based system 110 through one or more networks 104. In some embodiments, third-party devices 108 may be used as a relay for one or more of a plurality of client devices 103 to connect with networks 104 and/or communicate with network-based system 110. For example, a particular client device 103 may be in unidirectional or bidirectional communication with network-based system 110 and also with additional client devices 103, while the additional client devices 103 may not be in communication with network-based system 110.

Third-party devices 108 may be maintained by a third-party such as a bank, merchant, and/or any other entity. Third-party devices 108 may include ATM machines, payment card processors, payment terminals, payment kiosks, servers, and/or the like. In various implementations, third-party devices 108 may be a server that may host applications associated with or employed by a third party. The services may include, but are not limited to, location services, social networking, payment processing, payment verification, security, and/or the like.

Network-based system 110 may comprise one or more communications servers 120 to provide suitable interfaces that enable communication using various modes of communication and/or via one or more networks 108. Communications servers 120 may include a web server, an API server, and/or a messaging server to provide interfaces to one or more application servers 130. Application servers 130 of network-based system 110 may be structured, arranged, and/or configured to provide various online services such as, payment processing, payment security, payment authorization, authentication, account access, account security, identity theft prevention, proof of identity, and/or the like.

In various embodiments, one or more client devices 103 and/or merchant devices 108 may communicate with application servers 130 of network-based system 110 via one or more interfaces provided by communication servers 120. It may be appreciated that network-based system 110 may be structured, arranged, and/or configured to communicate with various types of client devices 103.

Application servers 130, in turn, may be coupled to and capable of accessing one or more databases 150 including, but not limited to, a security information database 152, a device identifier database 154, and/or an account data database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments. In some embodiments, the information held in the databases 150 may also be stored on one or more of client devices 103. The data may be held in a distributed fashion and/or in a redundant fashion. In some embodiments, the data may be encrypted for security.

Figure 2:
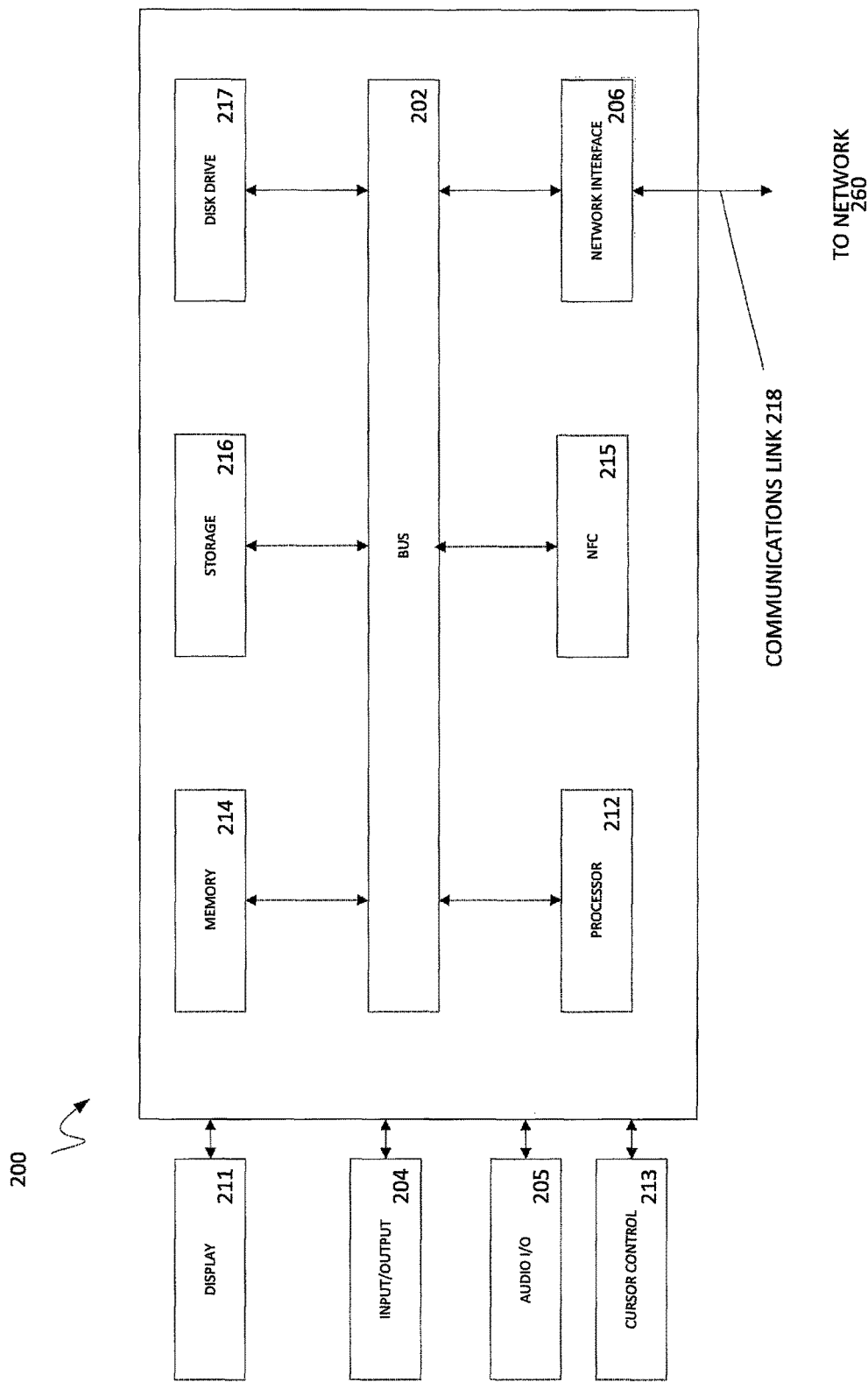
FIG. 2 is a block diagram of an exemplary computer system suitable for implementing one or more devices of the computing system in FIG. 1 and the embodiments in this disclosure.

FIG. 2 illustrates an exemplary computer system 200 in block diagram format suitable for implementing one or more devices of the computing system in FIG. 1 and/or as one or more devices implementing one or more embodiments discussed herein. In various implementations, a device that includes computer system 200 may comprise a personal computing device (e.g., a smart or mobile phone, a computing tablet, a personal computer, laptop, wearable device, PDA, Bluetooth device, key FOB, badge, etc.) that is capable of communicating with a network. Similarly, a service provider and/or a payment provider may utilize a network-computing device (e.g., a network server) capable of communicating with the network. It should be appreciated that each of the devices utilized by users, service providers, and payment providers may be implemented as computer system 200 in a manner as follows. Additionally, as more and more devices become communication capable, such as sensors using wireless communication to report, track, message, encrypt, relay information and so forth, these devices may be implemented as computer system 200. For example, a user may have clothing or jewelry with sensors, processors, and network interfaces. These devices may also be used in or a part of one or more of the embodiments disclosed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio.

Computer system 200 may include a near field communications (NFC) device 215. NFC device 215, in various embodiments may be positioned as such that it is capable of exchanging data with other devices with NFC technology when placed adjacent to and/or in close proximity to NFC device 215 (this is sometimes referred to as a "tap"). In some embodiments, computer system 200 may have an array of NFC devices arranged in rows and columns that span the entirety or part of computer system 200. However, this is merely exemplary and the array of NFC devices may be arranged in any shape and/or may cover a part of computer system 200.

NFC devices 215, in various embodiments, include an NFC transceiver circuitry and/or an NFC antenna. NFC devices may communicate using magnetic fields or electric fields, and may implement standards such as ECMA-340 (NFCIP-1), ECMA-352 (NFCIP-2), ISO/IEC 18092, ISO/IEC 21481, ISO/IEC 14443A, ISO/IEC 14443B, ISO/IEC 15693, JIS X6319-4, and FeliCa. However, it is contemplated that other short-range wireless communication technologies and standards (e.g., radio-frequency identification (RFID), Bluetooth or Bluetooth low energy (BLE), electromagnetic induction, etc.) may be utilized in place of NFC device 215 and fall within the scope of the present disclosure. One of ordinary skill in the art will recognize that the use of near field communication with NFC device 215 may be advantageously utilized to provide for low power communication, and also provide a more secure communication due to its short range.

NFC device 215, in various embodiments, may be configured to detect other devices with NFC technology near computer system 200, such as when other devices are within the range of NFC device 215 (e.g., within 2 cm, within 5 cm, within 10 cm, within 20 cm, etc.). NFC device 215 may create a communication area for detecting other devices with NFC capabilities. When other devices with NFC capabilities are placed in the communication area of NFC device 215, NFC device 215 may detect the other NFC capable devices and exchange data with the other NFC capable devices.

NFC device 215 may send and receive identifier data packets to and from other devices when in sufficiently close proximity. The identifier data packets may include one or more device identifiers, which may be operating system registry entries, cookies associated with an application, identifiers associated with hardware of the device, or various other appropriate identifiers. The identifiers may be used to identify devices, the user of the devices, a user account associated with the devices, and/or the user itself. NFC device 215 may further exchange other data and information with the other devices.

Computer system 200 may have a transceiver or network interface 206 that transmits and receives signals between computer system 200 and other devices, such as another user device, a merchant server, an email server, application service provider, web server, a social networking server, a payment provider server, and/or other servers via a network. In various embodiments, this transmission may be wireless, although other transmission mediums and methods may also be suitable. Computer system 200 may include a processor 212, which may be a micro-controller, digital signal processor (DSP), or other processing component, processes these various signals, such as for display on computer system 200 or transmission to other devices over a network 260 via a communication link 218. Communication link 218 may be a wireless communication in some embodiments. Processor 212 may also control transmission of information, such as cookies, IP addresses, and/or the like to other devices.

Components of computer system 200 may also include a system memory component 214 (e.g., RAM), a static storage component 216 (e.g., ROM), and/or a disk drive 217. Computer system 200 may perform specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including, but not limited to, telecommunications, mobile, and cellular phone networks) may perform instruction sequences to practice the present disclosure in coordination with one another.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system. Where applicable, the ordering of various steps described herein may be changed, omitted, combined into composite steps, and/or separated into sub-steps to provide features described herein.

The foregoing networks, systems, devices, and numerous variations thereof may be used to implement one or more services, such as the services discussed above and in more detail below.

Figure 3:
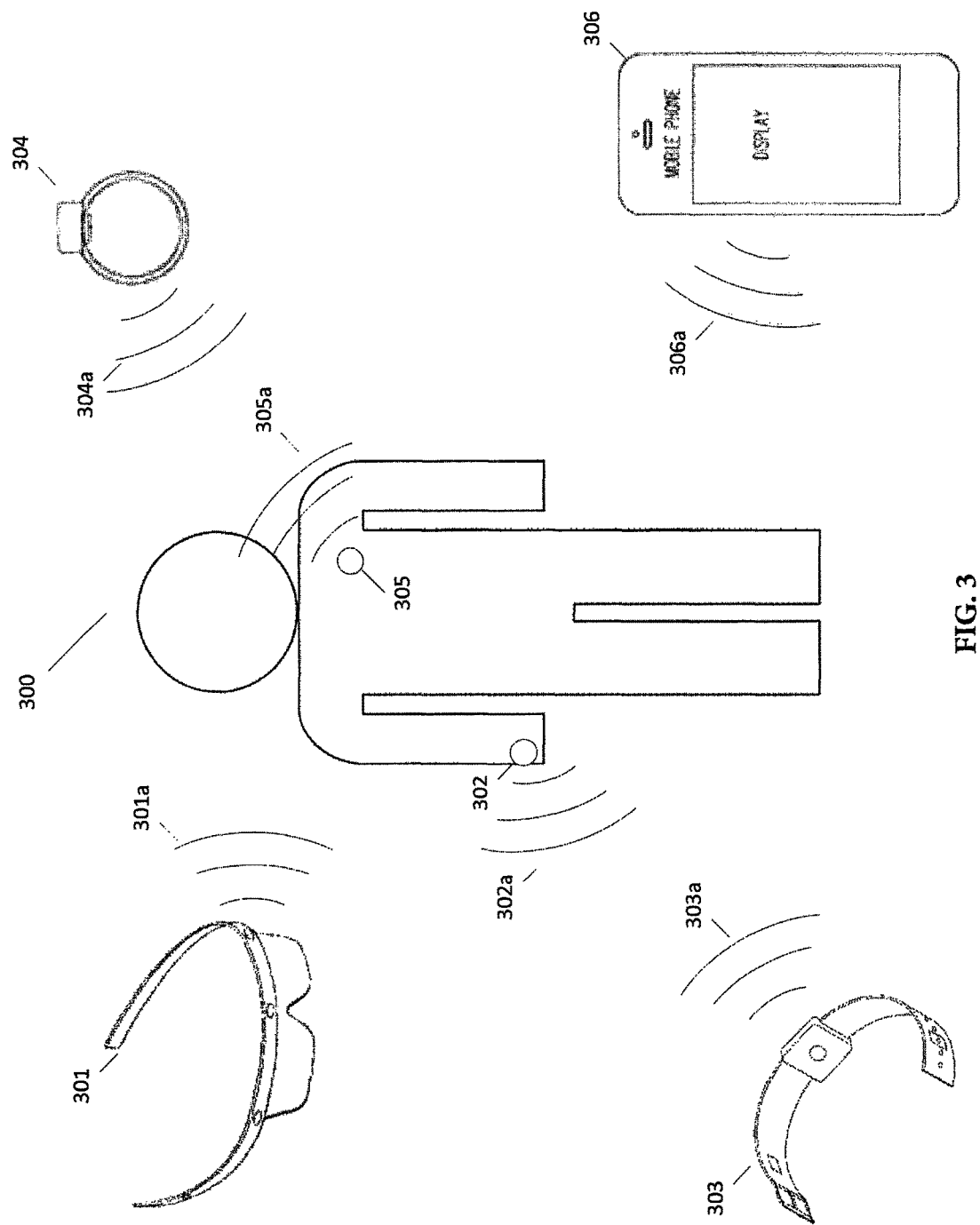
FIG. 3 illustrates a user with several devices implementing an exemplary multi-device authentication system.

FIG. 3 is an illustration of a user 300 with devices 301-306 implementing an exemplary system and method for multi-device authentication. In some examples, one or more of devices 301-306 may be incorporated as one or more client devices 103 of FIG. 1.

In some embodiments, devices 301-306 may be each configured to allow a user access to an account, such as a payment account, email account, computer account, and/or the like, when certain criteria are met. Each device may store keys, codes, and/or identifiers that are related to one or more accounts. The keys, codes, and/or identifiers may be unique to each device and may be natively held by non-transitory computer readable media on devices 301-306.

In some examples, devices 301-306 may contain near field communication (NFC) modules for transmitting and receiving data to other NFC devices. For example, one or more devices 301-306 may be configured to send data associated with keys, codes, and/or identifiers for accessing an account. In some examples, the keys, codes, and/or identifiers may be used to authorize payment for goods or services from a payment provider. The payment provider may be a bank, credit card company, payment services provider, such as PayPal®, merchant, and/or any other financial institution. The payment accounts may be handled by one or more devices such as third-party devices 108 and/or network-based system 110 of FIG. 1.

In some examples, the keys and codes may be used to access other types of accounts, such as email accounts, social media accounts (e.g. Facebook®, Twitter®, Instagram®, etc.), investment accounts, brokerage accounts, video game accounts, or any other suitable account.

In some embodiments, the one or more devices may cooperate to authorize access to an account. For example, an account may require a set of a plurality of unique codes, keys, and/or identifiers (collectively referred to as credentials), and the information may be split over two or more devices. In this example, the two or more devices may communicate with each other and share the credentials held on the device such that at least one of the two or more devices has a complete set of the plurality of credential parts. For example, one device may maintain a user name and the other device may maintain a password. The plurality of credential parts may be used by one of the devices for authentication and/or providing access to an account. In some examples, the complete set of credential elements may be held on the device temporarily. For example, the user device may be configured to erase, from memory, one or more of the credential elements making up the credential after a predetermined period of time and/or after a predetermined number of account accesses. In this manner, the system can ensure that all of the devices needed for access to an account are present. In some embodiments, the user device may check for all devices to be in communication with the user device before providing access to an account. In some embodiments, the credential set may be used to unlock, release, and/or enable a device to communicate another credential different from the set of credentials for accessing an account.

In some embodiments, one or more devices 301-306 may be designated as a master device and the other devices as slave or companion devices. The master device may contain additional functionality, responsibilities, and/or information that the other devices may not have. For example, the master device may maintain credentials capable of authenticating a user or providing credentials for accessing an account. The master device may store credential information for accessing an account that is unrelated to and different from the credential set and be configured to release, make available, enable, and/or provide the credentials for accessing an account in response to receiving the set of credentials from a plurality of slave devices.

The master device may be the device used to gather and store the set of credentials from the slave devices as part of an authentication process. In some embodiments, there may be more than one master device. In some embodiments, user 300 may be able to choose which devices are set as a master device. In this manner, a user may be able to pick a device that user 300 believes is least likely to be stolen and/or lost as the master device (such as an implant, ring, or watch). In some embodiments, whether a device is a master or a slave may depend on the account that is being accessed. A device may be set as a master device for one or more accounts, but as a slave device for one or more other accounts. In some embodiments, the master device may authorize slave devices for use in accessing an account. For example, when the master device has a full set of credentials, keys, and/or codes, the master device may enable one or more slave devices to be used as an authentication device or allow the salve devices to provide credentials to access one or more accounts.

In some embodiments, the master device may be a third party device (not shown), such as a point of sales system, and devices 301-306 may be used to provide the master device credentials for identifying and accessing an account.

In some embodiments, one or more of devices 301-306 may create a personal area network using short-range wireless communications 301a-306a. Short-range wireless communications 301a-306a may use a single wireless communication protocol, such as Bluetooth®, BLE, or the like. In some embodiments, wireless communications 301a-306a may use multiple communication protocols, such as Bluetooth® and Wi-Fi. Some devices may use one protocol, some devices may use another protocol, and some devices may use multiple protocols. Each of devices 301-306 may be configured to recognize and automatically connect with each other when in range of wireless communications 301a-306a. In some embodiments, the personal area network may implement a security measurement, such as a security key and/or encryption, to ensure that any communications are secure and authorized. In some embodiments, security may be established based on unique identifiers for the devices and/or an access control list.

In some embodiments, one or more devices 301-306 may have electrical contacts that may be used to communicate with another device when physically in contact with contacts of the other device. In some embodiments, these electrical contacts may be used to allow communications between devices in lieu of wireless communications or as an alternative to wireless communications.

Devices 301-306 may include, but are not limited to, devices such as eyewear 301, device implant 302, smart watch 303, ring 304, pin 305, and/or smartphone 306. Some systems may use more or less devices than shown in FIG. 3. In some embodiments, these devices may have actionable controllers, such as a physical button or a virtual button; one or more sensors (e.g. accelerometer, gyroscope, etc.) for detecting gestures; a finger print reader, and/or the like. The devices may be employed for conducting various commands, such as a panic button to turn off account access capabilities and/or other functions of one or more devices, notify entities that the device has been stolen, and/or the like. Additional examples of devices 301-306 may include processing/communication-enabled clothing, hats, key chains, shoes, wallets, belt buckles, earrings, necklaces, cuff links, pins or brooches, tattoos, keycards, embedded medical devices, biomechanical devices, and/or the like.

In some examples, devices 301-306 may be implants that may be implanted in the fingertips of a user. The devices may be configured to provide access to an account based on a particular combination of implants being pressed next to each other (e.g. touching the tip of the index finger with an implant to the tip of the thumb with another implant). An exemplary combination of motions for authenticating an account, assuming every fingertip has an implant, may be left thumb to left index, left thumb to left pinky, left thumb to right thumb, and right thumb to right index. Different combination of devices touching each other or being "tapped" with each other may authenticate for different accounts. For example, the above fingertip touching combination may be used to authenticate or login to an email account, and another combination, such as right pinky finger to left pinky finger may authenticate or login to a payment account. In some cases, the various steps of the combination may have differing temporal requirements for performing the particular step. Although this example is discussed in relation to the system using implants into fingertips, other embodiments may use other combination of suitable devices. For example, the system may use a fingertip implant, a lapel pin/pin button, a smart phone, a watch, and/or the like. An exemplary authentication using these devices may be conducted by touching the fingertip implant to the lapel pin for accessing a first account and touching the smartphone to the watch and then the lapel pin for accessing a second account.

In some embodiments, the implants in the fingers may include sensors, such as an accelerometer, for detecting and measuring the motion of the finger that the implant is inserted into. In some embodiments, the motion may cause the sensor to send out a signal indicating that the device has performed a gesture, and the signal may be sent to a device for accessing an account. Depending on the order in which the implants in the fingers send out the signal, the device may provide or deny access to an account. In some embodiments, the implants may have pressure sensors such that when a user presses on a hard surface with their fingers, as if playing a piano on a table, and causes a threshold pressure reading on the pressure sensor, the pressure sensors may cause the implant to send out a signal. In some embodiments, each implant may send a unique signal identifying the implant, and a device receiving the signal may check to see if the unique signals are received in an order matching a stored order. When the orders match, the device may authenticate the user or provide credentials for an account. In some embodiments, the unique signal may be a wireless data communication including data for key codes, account identifiers, and/or the like.

In some embodiments, one or more of devices 301-306 may contain applications and hardware to provide a variety of functionalities, which may include, but are not limited to, biometric monitoring, location services, input mechanisms and/or the like.

In some embodiments, one or more of the devices may be configured to conduct authentication based on the gesture conducted with one device in relation to the other device. For example, the motion of snapping a finger may cause a device implanted in the thumb to collaborate with a device implant in the middle finger to login to an account or authorize a merchant device to conduct a payment using financial information and/or a payment provider. The first and/or second implants may have one or more sensors for detecting this gesture, such as a pressure sensor, accelerometer, gyroscope, electromagnetic transceivers, motion detector, infrared sensor, infrared and/or the like. In some examples, one or more of the devices may store, in memory, motion sensor data indicative of one or more gestures, and the device may use the stored motion sensor data for comparison with data from one or more of the motion sensors and or devices. Motion sensor data may include measurements of distances that a device travels, the speed of travel, the acceleration, pressure, time and/or the like. When the received motion sensor data and the stored motion sensor data match, the device may begin one or more parts of a login method described herein. For example, the device may communicate a stored key code, identifier, username and/or the like to one or more devices, such as a point of sales device, master device, and/or a computing device being used for accessing an account.

In some embodiments, some devices may communicate credentials in response to a gesture detected in relation to another device, some devices may communicate credentials based on physical and/or wireless communication coupling, and some devices may communicate credentials based on a combination thereof. In some embodiments, some devices may implement different criteria for communicating credentials, the criteria being based on the device it is communicating with. For example a device may send credential X when communicatively coupled to one device, and credential Y different from credential X when communicatively coupled to another device.

In some embodiments, devices 301-306 may cooperate with a third-party device for authentication. For example, tapping a first device with a second device may produce a wireless signal that may be transmitted to a third-party device. Each tap from one device to another device may provide a signal unique from taps conducted with other devices, such that a combination of taps with different devices may create a code sequence based on the order in which each tap is conducted. The sequence may be used as a code for authenticating, accessing, and/or logging into an account on a third party device. In some embodiments, the sequence and/or code may be provided to a third-party device, such as a point-of-sales device and/or third-party devices 108 of FIG. 1, as authorization to transfer funds from a user account to a merchant account as part of a purchase of goods and/or services. In some embodiments, the wireless signal and/or code may include and/or may be used to identify a username, account identifier, and/or other payment information. In some embodiments, the third-party device or a system comprising the third-party device may relay the payment information to the remote server for use as authentication to a payment provider.

Figure 4:
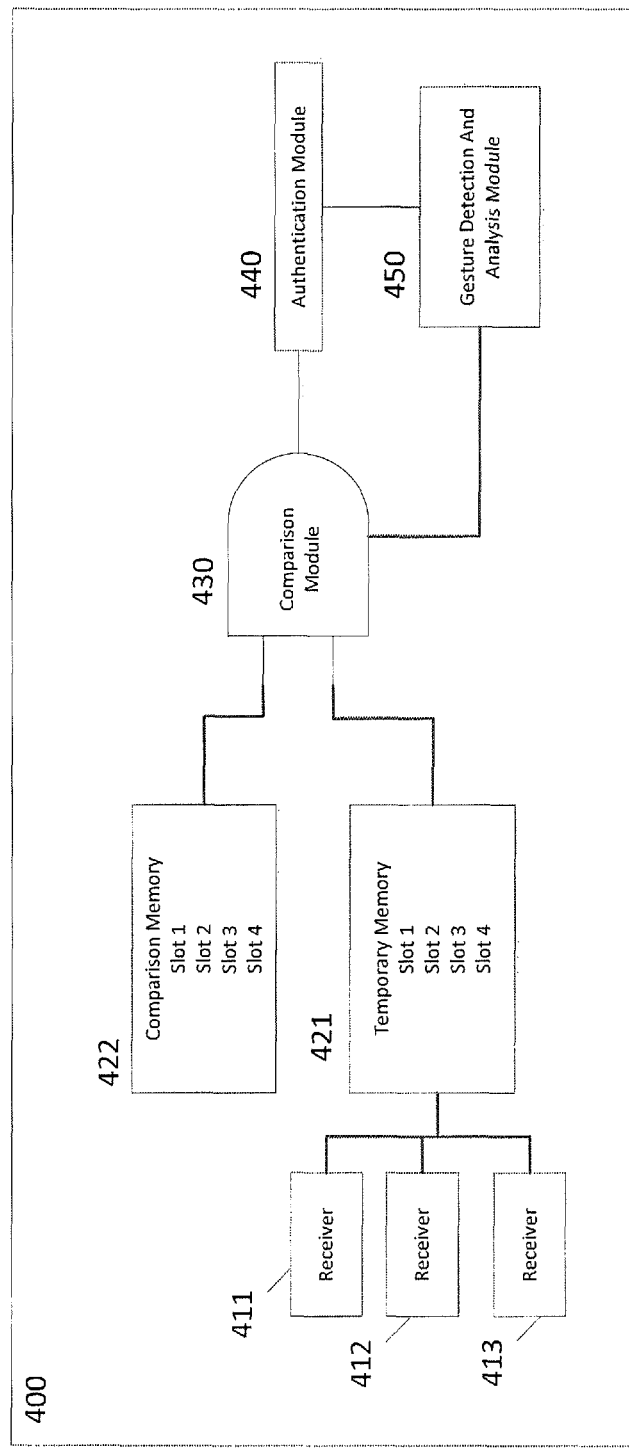
FIG. 4 is an exemplary block diagram of a component that may be included in one or more devices as part of a multi-device authentication system.

FIG. 4 illustrates an exemplary block diagram of an exemplary component 400 that may be included in one or more devices used as part of a multi-device authentication system. Component 400 may be included in one or more of client devices 103 of FIG. 1, third-party device 108 of FIG. 1, and/or one or more devices 301-306 of FIG. 3. Component 400 may be part of a point of sales system, a user device, and/or any other electronic device. Component 400 may be used within a master device in a multi-device authentication system that may collaborate with other devices, such as slave devices, for authenticating a user. For the sake of clarity, component 400 will be described as being implemented by a master device.

Component 400 may include one or more receivers 411-413 for receiving data from other electronic devices. Each receiver may be configured to receive data communications over different mediums and/or protocols. For example, receiver 411 may be configured to communicate wirelessly using Bluetooth, receiver 412 may be configured to communicate wirelessly using NFC, and receiver 413 may be configured to communicate over Wifi. In some embodiments, component 400 may also receive communication through a direct wire/contact connection with another device (not shown). In some embodiments component 400 may have more or less receivers. In some embodiments, one or more of the receivers may have transmitting capability, such as a transceiver. Receivers 411-413 may be communicatively coupled to a temporary memory 421. In some embodiments, temporary memory 421 may be one or more non-transitory computer readable media that make up the master device, such as memory 214, storage 216, and/or disk drive 217 of FIG. 2. Temporary memory 421 may be configured to be erased periodically or to only maintain information for a certain period of time. In some embodiments, the master device, such as computer system 200 of FIG. 2, may be configured to regularly purge and/or write over data held in temporary memory 421. In some embodiments, temporary memory may be configured to fill certain memory spaces or slots, such as slots 1-4 of temporary memory 421, in the order in which data is received from receiver 411, 412, 413, and/or data received in other manners, such as wired communications. Temporary memory 421 may include more or less memory slots than shown in FIG. 4.

Component 400 may also include a comparison memory 422. Comparison memory 422 may be one or more non-transitory computer readable media that make up the master device, such as memory 214, storage 216, and/or disk drive 217 of FIG. 2. Comparison memory 422 may be distinct and/or different from temporary 421. In some embodiments, comparison memory 422 may be configured differently than temporary 421, such that comparison memory 422 is not periodically erased. In some examples, comparison memory 422 may maintain the data held in comparison memory 422 until a user command to erase and/or overwrite the data is received by component 400. For example, the master device may have a panic button or reset setting that the user may actuate that causes the master device to purge sensitive and/or private information. In this manner, a user would be able to prevent fraudulent access to a user account when a device is stolen or borrowed by a friend.

In some embodiments, the panic button may cause the authentication module to provide fraud indicators. For example, if the master device implementing component 400 is used to conduct purchases, the panic button may cause the device to also conduct dummy purchases that may be easily identifiable as a fake purchase when viewing an account purchase history. In this manner, a thief may be able to use the device to conduct fraudulent purchases and the purchase history can be used to track where the thief is located. In some embodiments, the panic button may cause a purchase to end in a certain value, such as $x.01, $x.02, and so forth to indicate the order in which fraudulent purchases are being conducted and to indicate that those were purchases with the device conducted after the panic button was pressed. In some embodiments, the user device may automatically go into panic and/or fraud mode when a certain threshold of unsuccessful authentications occurs within a threshold period of time.

Temporary memory 421 and comparison memory 422 may be communicatively coupled to a comparison module 430. Comparison module 430 may be a combination of circuit logic configured to compare the data in temporary memory 421 and temporary memory 422. In some embodiments comparison module may be implemented using a processor and memory configuring the processor to compare the data in temporary memory 421 and comparison memory 422. In some embodiments, comparison module 430 may be a software implemented module.

In some embodiments, comparison module 430 may be configured to compare the memory slots of temporary memory 421 with the memory slots of comparison memory 422. As such, so long as every memory slot in temporary memory 421 matches a memory slot in comparison memory 422, comparison module 430 may output a match indication to authentication module 440. In some embodiments, comparison module 430 may be configured to compare matching slots in temporary memory 421 with matching slots in comparison memory 422. For example, comparison module 430 may compare slot 1 of temporary memory 421 with slot 1 of comparison memory 422, slot 2 of temporary memory 421 with slot 2 of comparison memory 422, and so forth. In this manner, the order in which the data is held in temporary memory 421 will affect whether comparison module 430 outputs a match indication to authentication module 440. The order in which the data is held in temporary memory 421 may depend on the order in which the data is received.

As shown, component 400 may include an authentication module 440 that is coupled to comparison module 430. In some embodiments, comparison module, when receiving a match indication from comparison module 430, may communicate authentication information or credentials to another device, such as a third-party device or a server, to provide access to an account. For example, the authentication module may communicate one or more of a password, user name, unique identifier, security code, and/or the like. In some embodiments, authentication module 440 may communicate the information held in comparison memory 422, temporary memory 421, and/or other memory (not shown). In some embodiments, the authentication module may be used to control another device, for example causing a lighting system to turn on a light, casing a car to turn on, cause a phone to make a phone call, causing a computer system login for use, cause a security door system to unlock/open, and/or the like.

In some embodiments, authentication module may communicate information using a wired and/or wireless communicator, such as one or more of receivers 411-413, which may be transceivers. In some embodiments authentication module 430 may be connected to a network for transmitting authentication information, such as network 104 of FIG. 1.

In some embodiments, authentication module 440 may be configured to transmit authentication information when and/or in response to a match indicator being received from comparison module 430 in addition to receipt of a user intent indicator. A user intent indicator may be an input of some sort, such as press of a button, or sensing of a gesture. In some embodiments, authentication module 440 may collaborate with a gesture detection and analysis module 450.

Gesture detection and analysis module 450 may include one or more hardware and software components to detect and analyze gestures made with the master device and/or detect gestures made with other devices in relation to the master device. For example, gesture detection and analysis module 450 may include one or more gesture detecting sensors, such as a motion sensor, accelerometer, gyroscope, pressure sensors, high accuracy GPS, and/or the like. In some embodiments, gesture detection and analysis module 450 may be equipped with one or more hardware and software components to detect the motion of another object and/or device, for example, gesture detection and analysis module 450 may include passive infrared sensors, ultrasonic motion detection sensors, and/or the like. In some embodiments, gesture detection and analysis module 450 may cooperate with one or more transmitters and/or receivers, such as receivers 411-413 (which also may be transmitters), to detect a gesture of another device in relation to component 400 or the device component 400 is contained in.

In some embodiments, gesture detection and analysis module 450 may be configured to detect a simple waving gesture using an accelerometer. For example, gesture detection and analysis module 450 may include an accelerometer configured to detect acceleration readings indicative of an alternating back and forth motion in rapid succession that is characterized by waving. In some examples, gesture detection and analysis module 450 may be configured to detect a short burst of acceleration readings indicative of a tapping motion. Gesture detection and analysis module 450 may be configured to detect any of the types of gestures discussed herein.

In some embodiments, gesture detection and analysis module 450 may be configured to cooperate with multiple sensors and or hardware components such that gesture detection and analysis module 450 may detect a gesture of the master device in relation to another device. For example, gesture detection and analysis module 450 may be configured to detect a tapping motion while communicatively coupled to another device using NFC. In some examples, gesture detection and analysis module 450 may be configured to detect a tapping motion while within a threshold distance of another device. Gesture detection and analysis module 450 may measure signal strength of a wireless communication from another device, such as a slave device, and use an accelerometer to determine whether a tapping motion was detected. The combination of the signal strength and the detected tapping motion may be indicative of a tapping motion being conducted with the master device in relation to the other device.

In some embodiments, the master device may use component 400 to cooperate with one or more other devices to detect more complicated gestures conducted with the device and one or more other devices in concert. For example, gesture detection and analysis module 450 may implement a phase array antenna to conduct direction signal strength detections of other devices receiving wireless communications. The phase array antenna may sweep in regular intervals such that another device receiving the wireless signal may regularly communicate the signal strength readings coming from the phase array antenna and allow the master device to determine the location of the other device based on the signal strength readings. For example, the master device may receive signal strength readings and an associated time stamp from the other device receiving a signal from the phase array antenna and use the time of the strongest received signal strength to match the direction of the phase array at that time. As such, the master device may be able to recursively determine the position of the other device in relation to the master device. In this manner, module 450 may be able to detect and measure more complicated motions of the other devices in relation to the device containing/using component 400. In this manner, gesture detection and analysis module 450 may be able to detect and/or distinguish a great number of gestures and complex gestures. For example, gesture detection and analysis module 450 may be able to detect a gesture such as circling a slave device around the master device containing/using module 400 and/or vice versa. In some embodiments, module 450 may implement multiple antennas in concert with and/or in lieu of a phase array antenna.

In some embodiments, a combination of one or more image sensors, infrared detectors, and/or echolocation systems may be used to detect the location of one device in relation to another device and detect the motion of one or more of the devices.

In some embodiments, the devices may each have one or more sensors and communicate sensor readings for use by gesture detection and analysis module 450 for determining a performed gesture. For example, one device may include an accelerometer, a gyroscope, and an infrared emitter, and another device may include an infrared sensor and an accelerometer. One of the devices may communicate sensor readings to the other device for use in determining a gesture or movement of both devices. In some examples, the device that has the motion sensor readings from both devices may extrapolate the movements of both devices in relation to each other. For example, the infrared emitter and sensor may allow a first device to determine where the second device is in relation to the first device. The first device may, using the accelerometer sensor readings of the first device, determine the gesture performed with the first device. The first device, when receiving the accelerometer readings from the second device, can also determine the motion performed by the second device. The first device, using the infrared readings, accelerometer readings of the first and second device, and a measurement of time for each reading discrete reading, can extrapolate the gesture of the first device in relation to the second device by using the infrared reading as the initial starting point. In a similar manner, other motion sensors, which may be split over multiple devices or on a single device, may be used in concert to detect gestures of one device and another device in relation to each other.

In some examples, four devices may work in concert to triangulate the location of each and every device in relation to the other device. In this example, a simple system of distance readings using wireless communication sensor strength and/or communication ping times may be used to locate every device in relation to the other devices. As such, gestures of every device in relation to the other devices may be determined.

In some embodiments, gesture detection and analysis module 450 may be coupled to multiple authentication modules, and depending on the gesture, gesture detection and analysis module 450 may send an account access indicator to one or more of the different authentication modules. In this manner, a different and possibly unique gesture may be used for accessing different accounts and/or conducting different actions, such as turning on a car, turning on a light, and/or the like. Furthermore, the differing gestures may be set up by the user such that the gestures serve as a security measure against fraudulent access to an account.

In some embodiments, gesture detection and analysis module 450 may be coupled to comparison module to aid in comparing data stored in comparison memory 422 and temporary memory 421. In some examples, the data stored in comparison memory 422 may be data indicative of a gesture and/or an authentication motion and temporary memory 421 may receive data indicative of a gesture and/or an authentication motion being performed by one or more devices. In this example, the comparison module may be configured to compare the gestures and/or authentication motions (such as a tapping motion) that the data is indicative of instead of a comparison for exact data matches. In some embodiments, the gesture detection and analysis module 450 may be configured to aid the comparison module in classifying or identifying the gesture and/or motions performed based on the data in comparison 422 and/or temporary memory 421 for comparison module 430 to compare. In this manner, motion data received from one or more devices may be used for accessing an account, authentication, and/or other actions.

In some embodiments, gesture detection and analysis module 450 may be configured to aid comparison module 430 to compare a gesture performed with one device in relation to the device contain component 400 for comparison. In some embodiments, gesture detection and analysis module 450 may be configured to analyze data in temporary memory 421 with additional sensor data that the device containing/using component 400 may receive, as discussed above, to determine a gesture performed in relation to the device containing/using component 400. As such, the comparison module may be able data stored in comparison memory 422 indicative of a device motion in relation to the device containing/using component 400 and received data indicative of a device motion in relation to the device containing/using component 400.

Although not shown, component 400 may be implemented using one or more hardware and software components, such as the hardware and software components discussed in FIG. 2, including a processor configured to implement and/or control hardware to perform one or more of the functions described in relation to component 400. In some embodiments, component 400 may be implemented within one or more devices, such as client devices 103 of FIG. 1 and devices 301-306 of FIG. 3. Additionally, one or more functions of component 400 may be conducted on a remote device, such as third-party devices 108 and/or network-based system 110 of FIG. 1. For example, some of the more process and memory intensive functions discussed with regards to component 400, such as gesture detection, comparisons, and/or analysis, may be conducted on a remote server which is communicatively coupled with component 400.

Figure 5:
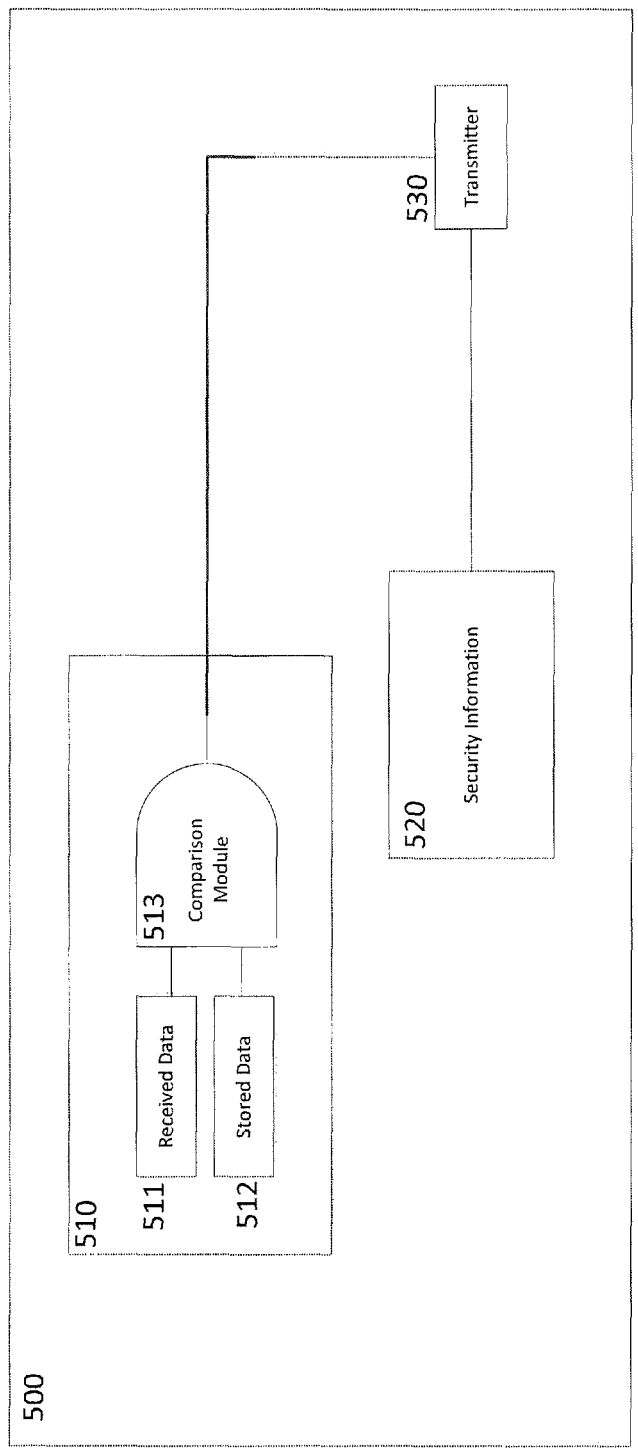
FIG. 5 is an exemplary block diagram of a key sharing component that may be included in one or more devices used as part of a multi-device authentication system.

FIG. 5 illustrates an exemplary block diagram of exemplary key sharing component 500 that may be included in one or more devices used as part of a multi-device authentication system.

In some embodiments, component 500 may have security information release module 510. Security information release module 510 may be a combination of hardware and software that controls when security information 520 is transmitted by transmitter 530. In some examples, module 510 may trigger the transmission of security information 520 using transmitter 530 when a certain received data 511 is received and matches stored data 512 when compared using comparison module 513. In some embodiments, received data 511 may be data indicative of a motion or a gesture. For example, received data 511 may be received from one or more motion sensing sensors, such as an accelerometer, gyroscope, and/or the like. In some embodiments, the received data may be data from one or more sensors from one or more devices similar to the gesture detection system discussed in relation to FIG. 4. In some examples, component 500 may be part of a device with an accelerometer, which may provide acceleration data indicative of a gesture to component 500.

In some examples, component 500 may be part of another device, such as smartphone 306 of FIG. 3, and receive accelerometer readings from a smart watch, such as smart watch 303 of FIG. 3, over one or more of the communication channels discussed herein. Received data 511 may also be received from one or more other devices, such as one or more of devices 103 of FIG. 1 and/or devices 301-306 of FIG. 3. In some embodiments, received data 511 may be a combination of motion sensor data received from motion sensors that are communicatively coupled to component 500 and motion sensor data sensed by another device, separate from the device containing/using component 500, which component 500 may have received through a communication channel with the other device.

In some embodiments, comparison module 513 may compare the received data 511 with stored data 512 to determine whether data 511 and 512 match or represent similar and/or the same gestures. In response, comparison module 513 may cause security information 520 to be transmitted using transmitter 530. Security information 520 may be a unique code, identifier, user name, password, and/or the like. In some embodiments information 520 may be a portion of a code, key, identifier, user name, and/or password that can be combined with security information from one or more other devices to complete a security credential.

Although information release module 510 uses received data as the criterion for releasing security information 520, in some embodiments, information release module 510 may include or use one or more other criteria for triggering communication of security information 520. For example, information release module 510 may be configured to release security information when it detects that component 500 or the device that contains component 500 is communicatively connected to one or more trusted devices, such as one or more devices 103 of FIG. 1 and/or devices 301-306 of FIG. 3. To determine whether a connected device is trusted, component 500 may store a list of identifiers of trusted devices as stored data 512 and compare a received data 511 indicative of a device identifier with the list to determine if the device is trusted. A device may be considered trusted when a match occurs with an identifier in the list.

Other trigger mechanisms may include but are not limited to, biometric signatures (e.g. finger print), voice commands, proximity determinations in relation to another device, and/or the like.

Although not shown, component 500 may be implemented using one or more hardware and software components, such as the hardware and software components discussed in FIG. 2, including a processor configured to implement and/or control hardware to perform one or more of the functions described in relation to component 500.

Figure 6:
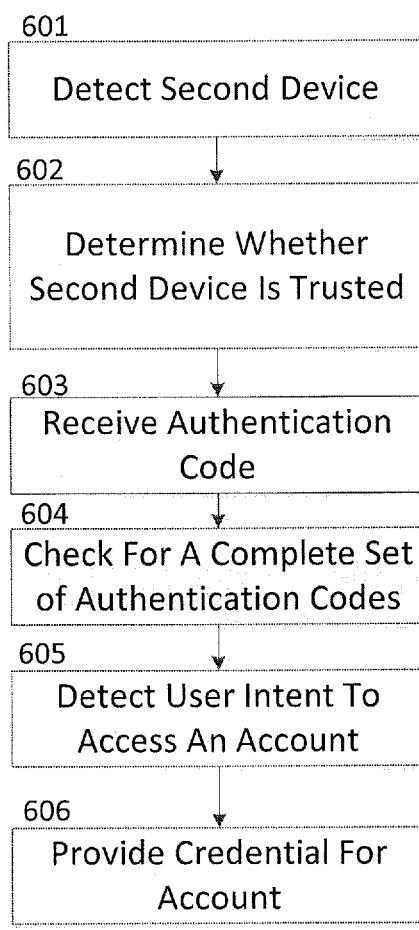
FIG. 6 is a flow diagram illustrating an exemplary authentication process used in a multi-device authentication system.

FIG. 6 is a flow diagram illustrating an exemplary process 600 that may be implemented in one or more devices for multi-device authentication. In some embodiments, process 600 may be implemented by one or more of the devices discussed in FIGS. 1, 2, and 3 using one or more of the components described in FIGS. 4 and 5. For ease of reference, process 600 is described as being implemented by a master device; however, process 600 may be implemented by a slave device, multiple devices, and/or any other suitable device.

At process 601, the master device may detect a second device. The second device may be an active device, passive device, or active device with passive elements. An active device as described herein may be a device that has circuitry capable of controlling and changing electron flow. A passive device, as described herein, may be a device incapable of controlling and/or changing electron flow.

In some embodiments, the master device may detect the second device when the second device sends a communication signal to the master device or attempts to communicatively couple with the master device. For example, the master device and second device may be Bluetooth enabled devices, and the master device may detect the second device attempting to pair with or conduct a communication handshake with the master device. In some examples, the master device may detect that the second device has electronically coupled to a communication channel of the master device. In some examples, the master device may detect a second device by detecting an inductive coupling with a second device, such as inductive coupling that occurs during NFC communications or when reading RFIDs. In some embodiments, the master device may detect the second device by scanning an optical readable medium of the second device, such as a barcode.

At process 602, the master device may determine whether the second device is a trusted device. The master device may determine whether the second device is a trusted device based on a device identifier received from the second device. In some examples, the master device may maintain a list of device identifiers for trusted devices on one or more non-transitory computer readable media, and the master device may determine whether the received device identifier matches any of the device identifiers in the list.

In some embodiments, the master device may determine whether the second device is trusted based on whether the second device supplies a correct password, identifier, security key, and/or the like. In some embodiments, the master device may determine whether the second device is trusted based on a gesture performed with the second device. The gesture may be used to indicate that the device or information from the second device can be trusted. For example, the second device may provide sensor data indicative of a gesture performed with the second device to the master device, and the master device may use to sensor data to determine whether the gesture matches an authentication gesture. In some embodiments, the master device may track the movement of the second device to obtain data indicative of the performed gesture for comparison with an authentication gesture. In some embodiments, the master device may determine whether the second device is trusted based a gesture performed with the second device in relation to the master device.

At process 603, the master device may receive authentication information, such as a code, from the second device. In some embodiments, the master device may allow the second device to communicate authentication information to the master device after the master device determines that the second device is trusted at process 602. In some embodiments, the master device may receive the authentication information from the second device after the master device requests the authentication information from the second device. In some embodiments, the master device may read the authentication information from the second device, such as from a barcode using an image sensor. In some embodiments, the authentication information may be received as part of the device identifier received. In some embodiments, the master device may retrieve authentication information stored in memory of the master device based on the device identifier. The authentication information may be generic authentication information which several trusted devices may share or unique authentication information associated with the device identifier of the second device.

At process 604, the master device may determine whether it has a complete set of authentication information. For example, the master device may be configured to use a combination of authentication information, such as several different codes, from a plurality of devices before releasing credentials for access to an account. In some embodiments, the authentication information received from the second device may be part of a set of authentication information used to access an account, and the master device may not be able to provide access to an account until after the set is recreated from multiple pieces of authentication information from other devices. When a complete set has not been received, the master device may wait for the complete set to be received from other devices before continuing to another process, such as process 606.

At process 605, the master device may receive an input or a trigger as an instruction for the master device to login to an account, provide access to an account, or provide credential for an account. The trigger may be a gesture, a press of a button, a receipt of a biometric signature (e.g. finger print), and/or the like. In some embodiments, the trigger may be the receipt of the authentication code in process 604 or when an authentication code is received that completes a set of authentication codes within a predetermined amount of time.

At process 606, the master device may provide the credential for the account in response to the trigger. In some embodiments, the master device may broadcast the credential using wireless communications. In some embodiment, the master device may provide the security credential through a secure communication with a device that is requesting the security information, such as a point of sales device, computer device, and/or the like. In some embodiments, the master device may be a point of sales device communicating with a payment provider to obtain monetary transfers from an account.

Figure 7:
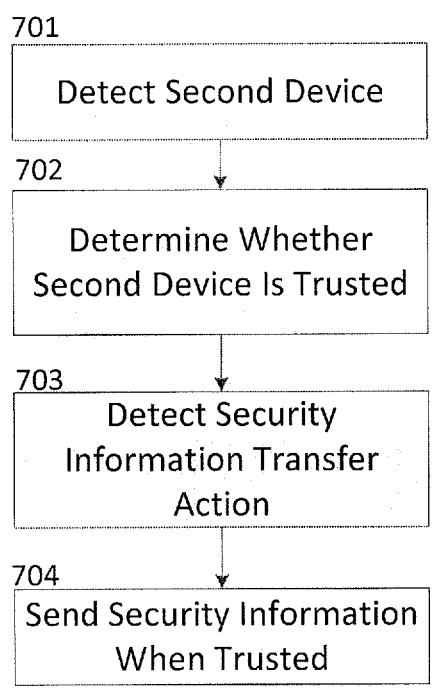
FIG. 7 is a flow diagram illustrating an exemplary process for sharing security information between devices in a multi-device authentication system.

FIG. 7 is a flow diagram illustrating an exemplary process 700 for providing security information to a device as part of a multi-device authentication system. In some embodiments, process 700 may be implemented by one or more of the devices discussed in FIGS. 1, 2, and 3 using one or more of the components described in FIGS. 4 and 5. In some embodiments, process 700 may be implemented to work in conjunction with a device implementing process 600 of FIG. 6. For ease of reference, process 700 is described as being implemented by a slave device; however, process 700 may be implemented by a master device, multiple devices, and/or any other suitable device.

At process 701, the slave device may detect a second device. In some embodiments, to detect the second device, the slave device may broadcast a wireless signal such that the slave device may be detected or discovered by a second device. The second device may then attempt to communicate with the slave device, and the slave device may use this communication attempt to detect the second device. In some examples, the slave device may detect the second device when the second device electronically couples with the slave device, such as when a communication channel of the slave device is connected electrically coupled to a communication channel of the second device. In some examples, the slave device may detect a second device by detecting an inductive coupling with a second device, such as inductive coupling that occurs during NFC communications.

At process 702, the slave device may determine whether the second device is trusted. In some embodiments, the slave device may determine whether the second device is trusted by requesting or receiving a device identifier and matching the identifier with an access control list. The access control list may be held on the slave device that limits communications with the slave device when a device has device identifiers not in the access control list. For example, the access control list may contain media access control (MAC) addresses that limit communications with the salve device when the device does not have a MAC address on the access control list. In some embodiments, process 702 may determine whether a second device is trusted in a similar manner as process 602 of FIG. 6.

At process 703, the slave device may receive an input for triggering the slave device to send the security information. The input may be a gesture, a gesture in relation to the second device, a press of a button, and/or the like.

At process 704, the slave device, in response to one or more of processes 701-703 may send the security information to the second device.

In some embodiments, one or more devices implementing process 700 may cooperate with one or more devices implementing process 600. For example, a user may bring a device implementing process 600 near a device implementing process 700. One device may detect the presence of the other device or both devices may detect the presence of each other based on detecting wireless communication signals emitted from one or more of the devices. The one or more of the devices may determine whether the other device is trusted, and in response to determining that the devices are trusted, may set up a communication channel for sending and receiving data. At one point, the device implementing process 700 may receive an input causing the device to send security data over the communication channel to the device implementing process 600. The device implementing process 600 may store the security data in memory. In some embodiments, the security data received from process 700 may be part of a set and the device implementing process 600 may wait for additional security data until the set is complete. For example, a passive device, such as an RFID, may be placed in front of a RFID reader of the device implementing process 600, and the device implementing process 600 may read the RFID using the RFID reader to obtain additional security data that may complete the set of security data. After receiving a complete set of security data, the device implementing process 600 may detect user intent to access an account. In some embodiments, that may be a gesture performed as the input causing the device implementing process 700 to send its security data. In some embodiments, the detected intent may be received input indicative of a gesture performed with the device implementing process 700. In some embodiments, the intent may be assumed once a complete set of security information is received by the device.

In response to detecting the user intent, the device implementing process 700 may provide access to an account, such as a payment account, email account, and/or the like. In some embodiments, the device implementing process 700 may be a point of sales device, and access to an account may include requesting or conducting a funds transfer from a user account to a merchant account for the purchase of goods and/or services. In other examples, processes 700 and 600 may be implemented by other devices, such as one or more of the client devices 103 of FIG. 1 and/or devices 301-306 of FIG. 3.

In some embodiments, a system may not need a device implementing process 700. For example, a user may have several RFID devices and/or QR codes that when provided in a certain order to a device implementing process 600, may cause the device implementing process 600 to provide access to an account. In this example, process 600 may not conduct one or more of processes 601-606, such as determining whether a device is trusted.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer implemented method for security and authentication of a user based on network communications, the method comprising the steps of:
    establishing a communication channel between a first device and a second device, wherein the establishing of the communication channel is performed in response to detecting a physical or an electrical coupling between the first device and the second device;
    receiving, via the communication channel and from one or more sensors of the first device, sensor data indicating that a first gesture has been performed with at least the first device, the received sensor data including one or more of: a distance traveled by the first device to perform the first gesture, a speed of the first device to perform the first gesture, an acceleration of the first device to perform the first gesture, a pressure experienced by the first device to perform the first gesture, or a time duration of the first gesture;
    comparing the received sensor data with stored sensor data that indicates a performance of a second gesture, the stored sensor data being stored on the second device;
    determining, based on the comparing, whether the first gesture matches the second gesture;
    receiving, through the communication channel and in response to a determination that the first gesture matches the second gesture, a first authentication credential from the first device;
    comparing the first authentication credential with a second authentication credential that is stored on the second device, wherein the first authentication credential or the second authentication credential includes a user identifier for accessing an account; and
    accessing the account via at least one of: the first authentication credential or the second authentication credential;
    wherein:
    the second device stores the first authentication credential until a predetermined amount of time is reached; and
    the second device deletes the first authentication credential from the second device after a threshold time has elapsed or after the account has been accessed.

2. The method of claim 1, wherein at least one of the first and second devices is implanted into a user of the first device and the second device.

3. The method of claim 1, wherein the received sensor data indicates that the first gesture includes a tapping motion.

4. The method of claim 1, wherein the accessing of the account comprises sending the first authentication credential or the second authentication credential to a third device, and wherein the third device includes a remote server, a point of sales device, or a computing device used for accessing the account.

5. The method of claim 1, wherein one of the first and second authentication credentials includes a user identifier for accessing the account, and the other one of the first and second authentication credentials includes a password associated with the user identifier.

6. The method of claim 1, further comprising: deleting the first authentication credential from the second device after the account is accessed.

7. The method of claim 1, wherein the one or more sensors are selected from the group consisting of: a pressure sensor, an accelerometer, a gyroscope, an electromagnetic transceiver, a motion detector, and an infrared emitter.

8. A multi-device security system comprising:
    a first device that includes one or more sensors and a first non-transitory memory that stores a first authentication credential, wherein the one or more sensors are configured to detect a first gesture performed by the first device; and a second device that includes one or more hardware processors and a second non-transitory memory, the second non-transitory memory storing a second authentication credential and sensor data associated with a second gesture, wherein the one or more hardware processors are configured to execute instructions to cause the system to perform operations comprising:
        establishing a communication channel between the first device and the second device, wherein the establishing of the communication channel is performed in response to detecting a physical or an electrical coupling between the first device and the second device;
        receiving, via the communication channel and from the one or more sensors of the first device, sensor data from the first device, the sensor data indicating that the first gesture has been performed with at least the first device, the received sensor data including one or more of: a distance traveled by the first device to perform the first gesture, a speed of the first device to perform the first gesture, an acceleration of the first device to perform the first gesture, a pressure experienced by the first device to perform the first gesture, or a time duration of the first gesture;
        comparing the received sensor data with the sensor data stored on the second device, the stored sensor data indicating a performance of a second gesture;
        determining, based on the comparing, whether the first gesture matches the second gesture;
        receiving, through the communication channel and in response to a determination that the first gesture matches the second gesture, the first authentication credential from the first device;
        comparing the first authentication credential with the second authentication credential that is stored on the second non-transitory memory, wherein the first authentication credential or the second authentication credential includes a user identifier for accessing an account; and accessing the account via at least one of: the first authentication credential or the second authentication credential;

wherein:

the second device stores the first authentication credential in the second non-transitory memory until a predetermined amount of time is reached; and the second device deletes the first authentication credential from the second non-transitory memory after a threshold time has elapsed or after the account has been accessed.

9. The multi-device security system of claim 8, wherein one of the first and second authentication credentials includes a password associated with the user identifier.

10. The multi-device security system of claim 8, wherein the first gesture is performed by the first device relative to the second device, and wherein the one or more sensors are selected from the group consisting of: a pressure sensor, an accelerometer, a gyroscope, an electromagnetic transceiver, a motion detector, and an infrared emitter.

11. One or more non-transitory computer readable media having stored thereon machine-readable instructions executable to cause a machine to perform operations comprising:

establishing a communication channel between a first device and a second device, wherein the establishing of the communication channel is performed in response to detecting a physical or an electrical coupling between the first device and the second device;

receiving, via the communication channel and from one or more sensors of the first device, sensor data indicative of a first gesture performed with at least the first device, the received sensor data including one or more of: a distance traveled by the first device to perform the first gesture, a speed of the first device to perform the first gesture, an acceleration of the first device to perform the first gesture, a pressure experienced by the first device to perform the first gesture, or a time duration of the first gesture;

comparing the received sensor data with stored sensor data indicative of a performance of a second gesture, the stored sensor data being stored on the second device;

determining, based on the comparing, whether the first gesture matches the second gesture;

receiving, through the communication channel and in response to a determination that the first gesture matches the second gesture, a first authentication credential from the first device;

comparing the first authentication credential with a second authentication credential that is stored on the second device, wherein the first authentication credential or the second authentication credential includes a user identifier for accessing an account; and accessing the account via at least one of: the first authentication credential or the second authentication credential;

wherein:

the second device stores the first authentication credential until a predetermined amount of time is reached; and the second device deletes the first authentication credential from the second device after a threshold time has elapsed or after the account has been accessed.

12. The one or more non-transitory computer readable media of claim 11, wherein the operations further comprise: deleting the first authentication code from the second device after the account is accessed.

13. The one or more non-transitory computer readable media of claim 11, wherein at least some of the one or more sensors of the first device are implanted in a user.

14. The one or more non-transitory computer readable media of claim 11, wherein the first gesture is performed by the first device relative to the second device, and wherein the one or more sensors are selected from the group consisting of: a pressure sensor, an accelerometer, a gyroscope, an electromagnetic transceiver, a motion detector, and an infrared emitter.

15. The one or more non-transitory computer readable media of claim 11, wherein the accessing the account comprises communicating the first authentication credential or the second authentication credential to a third device.

16. The one or more non-transitory computer readable media of claim 15, wherein one of the first and second authentication codes includes a user identifier for accessing the account, and the other one of the first and second authentication codes includes a password associated with the user identifier, and wherein the third device includes a remote server, a point of sales device, or a computing device used for accessing the account.

* * * * *